(12) United States Patent
Jaiswal et al.

(10) Patent No.: US 11,119,951 B2
(45) Date of Patent: Sep. 14, 2021

(54) UPDATING HOST DISCOVERY RECORDS BASED ON TARGET RECONFIGURATION

(71) Applicant: INTERNATIONAL BUSINESS MACHINES CORPORATION, Armonk, NY (US)

(72) Inventors: Abhishek Jaiswal, Pune (IN); Komal S. Shah, Pune (IN); Kanishka Keshav, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 16/664,400

(22) Filed: Oct. 25, 2019

(65) Prior Publication Data

US 2021/0124695 A1     Apr. 29, 2021

(51) Int. Cl.
*G06F 13/16*     (2006.01)
*G06F 13/42*     (2006.01)

(52) U.S. Cl.
CPC ...... *G06F 13/1668* (2013.01); *G06F 13/4221* (2013.01); *G06F 2213/0036* (2013.01)

(58) Field of Classification Search
None
See application file for complete search history.

(56) References Cited

U.S. PATENT DOCUMENTS

| | | | |
|---|---|---|---|
| 6,601,119 B1 | 7/2003 | Slutz et al. | |
| 10,200,376 B2 | 2/2019 | Cayton et al. | |
| 10,277,671 B2 | 4/2019 | Passeri et al. | |
| 2014/0075169 A1* | 3/2014 | Andrews | G06F 8/60 713/2 |
| 2015/0331894 A1* | 11/2015 | Barron | G06F 16/1837 707/622 |
| 2019/0042144 A1 | 2/2019 | Peterson et al. | |

* cited by examiner

*Primary Examiner* — Scott C Sun
(74) *Attorney, Agent, or Firm* — Stosch Sabo; Brian F. Russell (57) ABSTRACT

A controller of a data storage system reconfigures a target storage node within the data storage system including by assigning the target storage node a new target node name in place of a former target node name. The controller provides a reconfiguration notification, the former target node name, and the new target node name to a host platform having an ongoing first communication session with the target storage node. Following the reconfiguration notification, the controller responds to a login request of the host platform and establishes a new second communication session between the host platform and the target storage node. The host platform can logout of the now-stale first communication session after the second communication session is established.

21 Claims, 5 Drawing Sheets

UPDATING HOST DISCOVERY RECORDS BASED ON TARGET RECONFIGURATION

BACKGROUND OF THE INVENTION

This disclosure relates to data processing and data storage systems, and in particular, to updating discovery records of a host data processing system based on reconfiguration of a target data storage device.

In data center environments, hosts are connected to back-end storage, which is exposed to the hosts via one or more interconnect protocols, such as Internet Small Computer System Interface (iSCSI), iSCSI Extensions for Remote direct memory access (iSER), Non-Volatile Memory Express over Fabrics (NVMeF), etc. An interconnect protocol typically allows a host acting in the role of an initiator and a storage device acting in the role of a target to negotiate login parameters and to perform input/output (I/O) operations. For example, the interconnect protocol typically allows the initiator to discover the target, and after discovery, to login to the target to gain visibility to the data stored with the target. After successful exposure of the target, block level data can be exchanged between the initiator and the target.

In a typical implementation, the initiator stores target information (e.g., the target node name, Internet Protocol (IP) address, and port number) learned in the discovery process persistently as a discovery record in a local file at the initiator. The host can thereafter utilize the discovery record to quickly re-establish a session if the host is rebooted or logs out of the target.

BRIEF SUMMARY

The present disclosure appreciates that, in some operating scenarios, a target may undergo a reconfiguration in which the target node name changes without interrupting existing host sessions. After such a target re-configuration, if an initiator attempts to login again following a host failure or restart, the initiator will transmit a login request including the target node name contained in the discovery record, as the initiator is not aware of target re-configuration. This login request will be rejected based on use of the old target node name. The rejection may disrupt host I/O operations and can lead to repeated failed attempts to login utilizing the old target node name, which undesirably wastes resources at both the initiator and the target.

Accordingly, in one or more embodiments, the data storage system can be configured to provide notification of the reconfiguration of the target node name to the initiator. In one embodiment, a controller of a data storage system reconfigures a target storage node within the data storage system including by assigning the target storage node a new target node name in place of a former target node name. The controller provides a reconfiguration notification, the former target node name, and the new target node name to a host platform having an ongoing first communication session with the target storage node. Following the reconfiguration notification, the controller responds to a login request of the host platform and establishes a new second communication session between the host platform and the target storage node.

In at least one embodiment, a processor of a host platform receives from a data storage system a reconfiguration notification specifying a new target node name assigned to a target storage node within the data storage system with which the host platform has an ongoing first communication session via an input/output (I/O) fabric. In response to receiving the reconfiguration notification, the processor automatically transmits to the data storage system via the I/O fabric a discovery request specifying address information for the data storage system. Thereafter, the processor logs into the target storage node and establishes a new second communication session between the host platform and the target storage node. The host platform can then logout of the now-stale first communication session.

DETAILED DESCRIPTION

Figure 1:
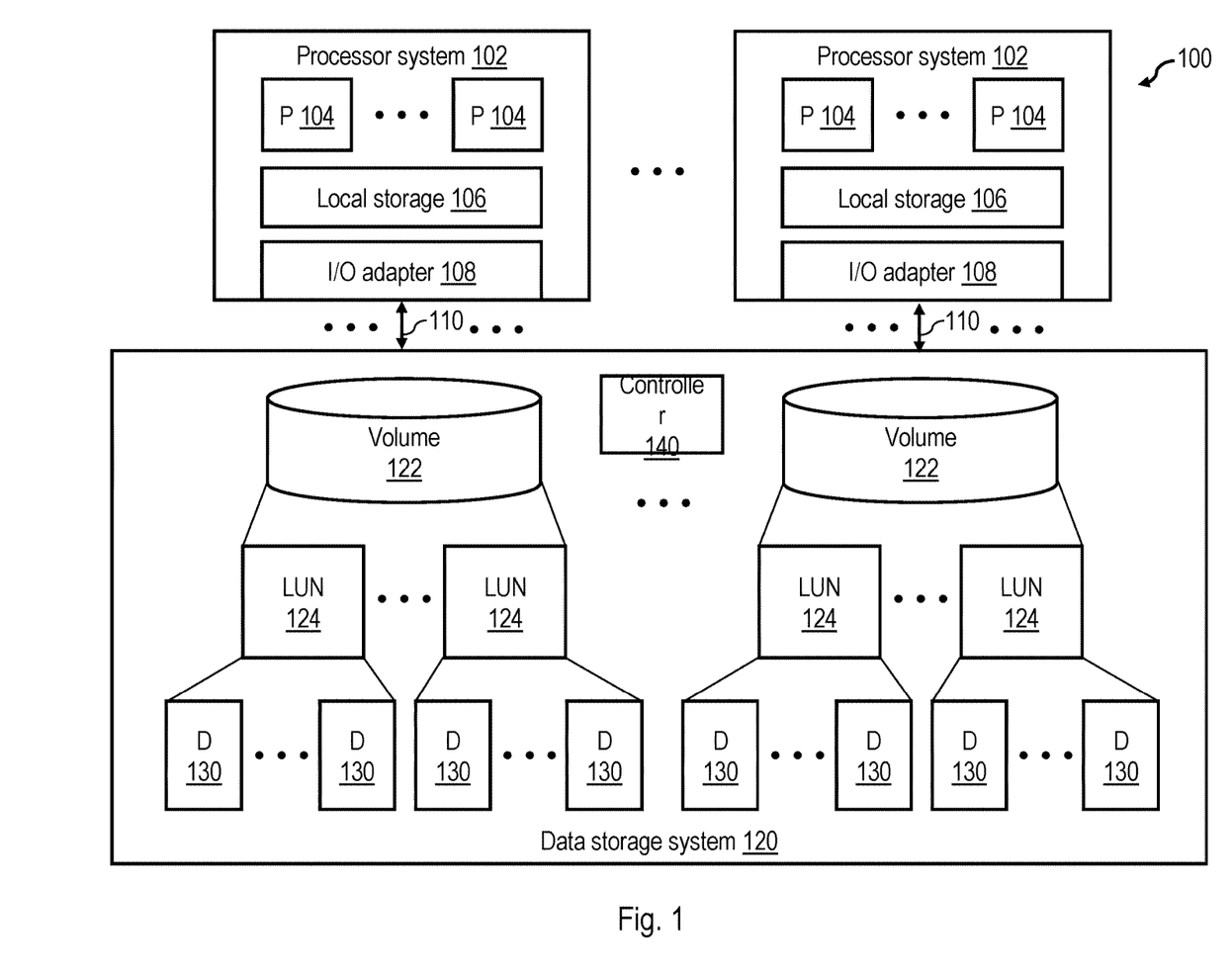
FIG. 1 is a high-level block diagram of a data processing environment in accordance with one embodiment.

With reference to the figures and with particular reference to FIG. 1, there is illustrated a high-level block diagram of an exemplary data processing environment 100. As shown, data processing environment 100 includes one or more hosts, such as processor systems 102, which each have one or more processors 104 that process instructions and data. A processor system 102 may additionally include local storage 106 (e.g., dynamic random access memory (DRAM) or disks) that may provide persistent and/or volatile store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, POWER, Intel X86, or any other processor combined with any of memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O fabric 110. In various embodiments, I/O fabric 110 may employ any one or a combination of known or future developed communication protocols, including, for example, Internet Small Computer System Interface (iSCSI), iSCSI Extensions for RDMA (iSER), Non-Volatile Memory Express over Fabrics (NVMeF), Fibre Channel (FC), FC over Ethernet (FCoE), InfiniBand, Transport Control Protocol/Internet Protocol (TCP/IP), Peripheral Component Interconnect Express (PCIe), etc. I/O requests communicated via I/O fabric 110 include host discovery and login requests (and associated responses), as well as read requests by which a processor system 102 requests data from data storage system 120 and write requests by which a processor system 102 requests storage of data in data storage system 120.

In the illustrated embodiment, data storage system 120 includes at least one and possibly numerous storage devices 130. Data storage system 120 additionally includes one or more levels of control circuitry and/or control logic represented by controller 140, which may include hardware, software, firmware, or a combination thereof. Depending on the configuration of data storage system 120, controller 140 may present the contents of storage devices 130 to initiators, such as processor systems 102, via a logical interface, for example, one or more storage volumes 122 each including one or more logical units (LUNs) 124. Depending on the desired configuration or implementation, controller 140 can assign storage devices 130 and/or logical abstractions such as LUNs 124 unique target node names (e.g., iSCSI Qualified Name (IQN) or NVMe Qualified Name (NQN)).

Figure 2:
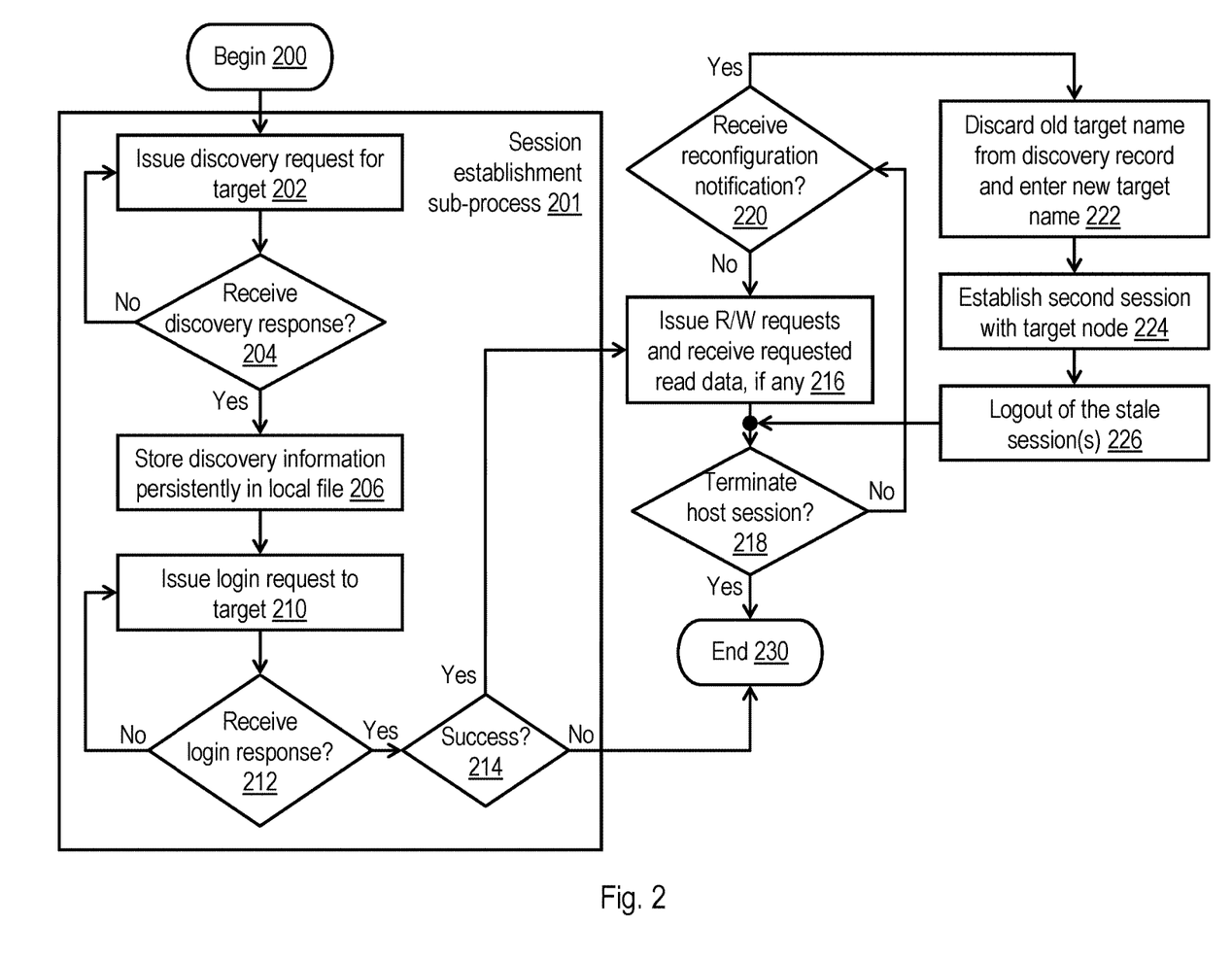
FIG. 2 is a high-level logical flowchart of an exemplary process by which a host data processing system in the role of an initiator communicates with a target in accordance with one embodiment.

Referring now to FIG. 2, there is depicted a high-level logical flowchart of an exemplary process by which a processor system 102 in the role of an initiator communicates with a target, such as a LUN 124 or storage device 130, in accordance with one embodiment. To promote greater understanding, the process of FIG. 2 will be described with additional reference to the time-space diagram given in FIG. 3.

Figure 3:
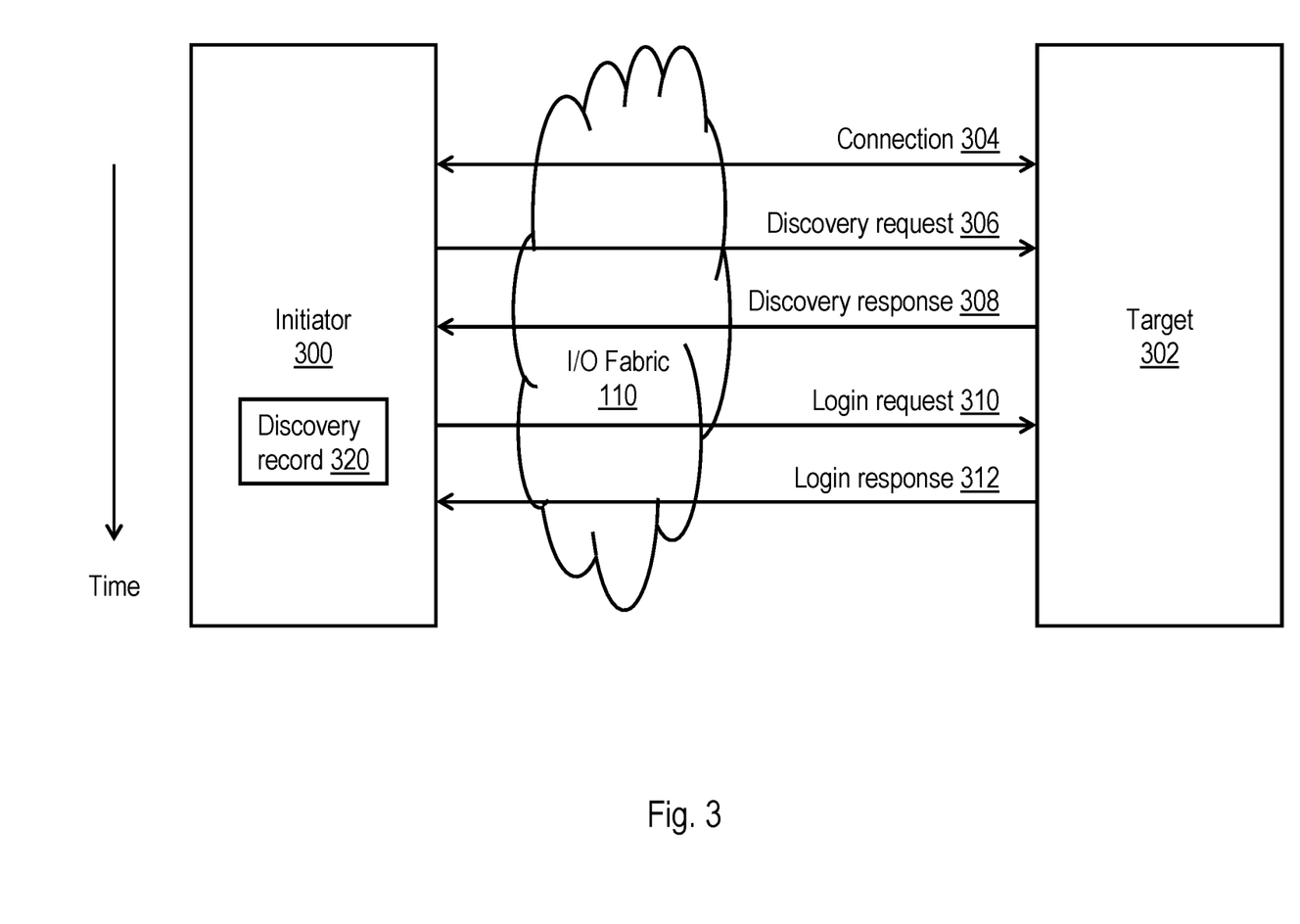
FIG. 3 is a first time-space diagram of communication between an initiator and a target in accordance with one embodiment.

The process of FIG. 2 begins at block 200 with an initiator 300, such as a processor system 102, having established a connection 304 (e.g., a TCP connection) with a target 302, such as one of LUNs 124 or storage devices 130, via I/O fabric 110. The process of FIG. 2 proceeds from block 200 to blocks 202-214, which together form a session establishment sub-process 201 by which initiator 300 establishes a communication session with a chosen target 302. In session establishment sub-process 201, initiator 300 first issues a discovery request 306 for a particular target 302 on I/O fabric 110 (block 202) and then awaits receipt of a discovery response 308 from the target 302 (block 204).

If no discovery response is received within a protocol-dependent interval, the initiator 300 may re-issue the discovery request, as indicated by the process returning from block 204 to block 202. If, however, the desired target 302 is reached by discovery request 306 of initiator 300, target 302 responds with a discovery response 308, which includes discovery information including, for example, a set of target Internet Protocol (IP) addresses, a port number, and a target node name (e.g., the iSCSI Qualified Name (IQN) or NVMe Qualified Name (NQN)) of target 302. As indicated at block 206, in response to receipt of discovery response 308, initiator 300 persistently stores the discovery information within a discovery record 320 in a local file at initiator 300 (e.g., in local storage 106 of a processor system 102). Initiator 300 can utilize the discovery information from this local file, for example, to re-establish host attach sessions in host reboot and re-login scenarios.

Block 210 of FIG. 2 illustrates initiator 300 issuing a login request 310 to target 302 via I/O fabric 110. Login request 310 includes the target node name learned in discovery response 308. Initiator 300 then awaits receipt of a login response from target 302 (block 212). If no login response is received within a protocol-dependent interval, the initiator 300 may re-issue the login request, as indicated by the process returning from block 212 to block 210. If, however, the desired target 302 is reached by login request 310 of initiator 300, target 302 responds with a login response 312, indicating success or failure of the login request.

In response to a login response 312 from target 302, initiator 300 determines at block 214 whether or not the login was successful. If not, for example, if initiator 300 lacks sufficient permissions to access target 302, the process of FIG. 2 ends at block 230. If, however, login response 312 indicates the login was successful, target 302 exposes the data contents of target 302 to access by initiator 300. Thus, following the successful establishment of a communication session in session establishment sub-process 201, initiator 300 may proceed to issue read and/or write requests directed to the data blocks and to receive the requested data blocks, if any, from target 302 (block 216).

As indicated at block 218, if initiator 300 or target 302 terminates the host session with target 302, the process of FIG. 2 ends at block 230. As long as the host session continues between target 300 and initiator 302, initiator 300 continues to monitor for a reconfiguration notification from target 302 (block 220), as discussed below in greater detail with reference to FIGS. 4-5. The reconfiguration notification includes, at a minimum, a new target node name for target 302 and preferably includes both the new target node name and the old target node name for target 302. If no reconfiguration notification is received from target 302 at block 220, the process returns to block 216 and following blocks, which have been described. If, however, initiator 300 detects receipt of a reconfiguration notification from target 302 at block 220, the process proceeds to block 222.

Block 222 illustrates initiator 300 updating or replacing discovery record 320 to discard the old target node name of target 302 and enter the new target node name supplied in the reconfiguration notification. Initiator 300 additionally establishes a second communication session with the target 302 utilizing the session establishment sub-process 201 as previously described (block 224). After the second communication session is established, initiator 300 can optionally logout of the now-stale prior session with target 302 (block 226). The process then returns to block 218, which has been described.

As should be appreciated from the process of FIG. 2, because target 302 proactively notifies initiator 300 of the change in its target node name in advance of any session-terminating event (e.g., a host reboot), initiator 300 will, if such an event occurs, be able to automatically re-login to target 302 without administrator intervention.

Figure 4:
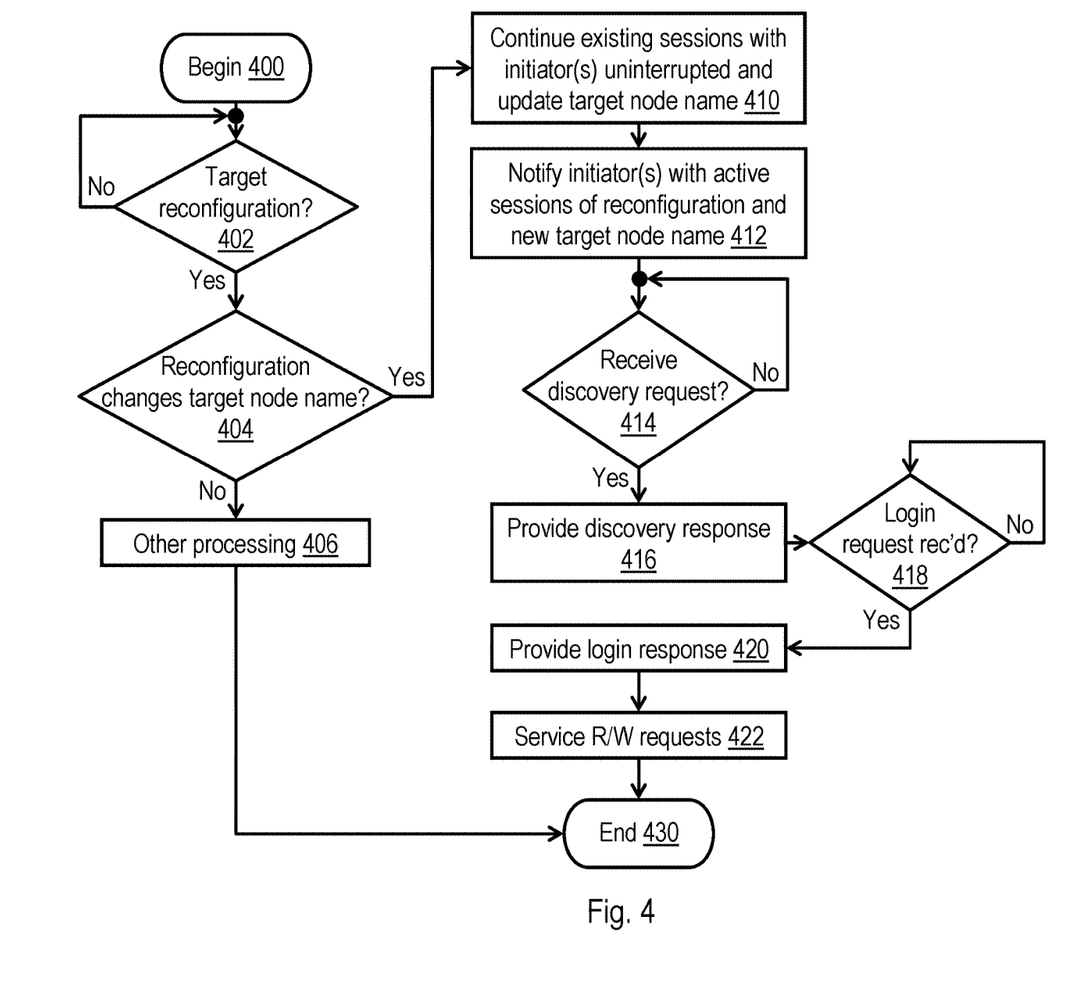
FIG. 4 is a high-level logical flowchart of an exemplary process by which a target communicates with an initiator in accordance with one embodiment.
Figure 5:
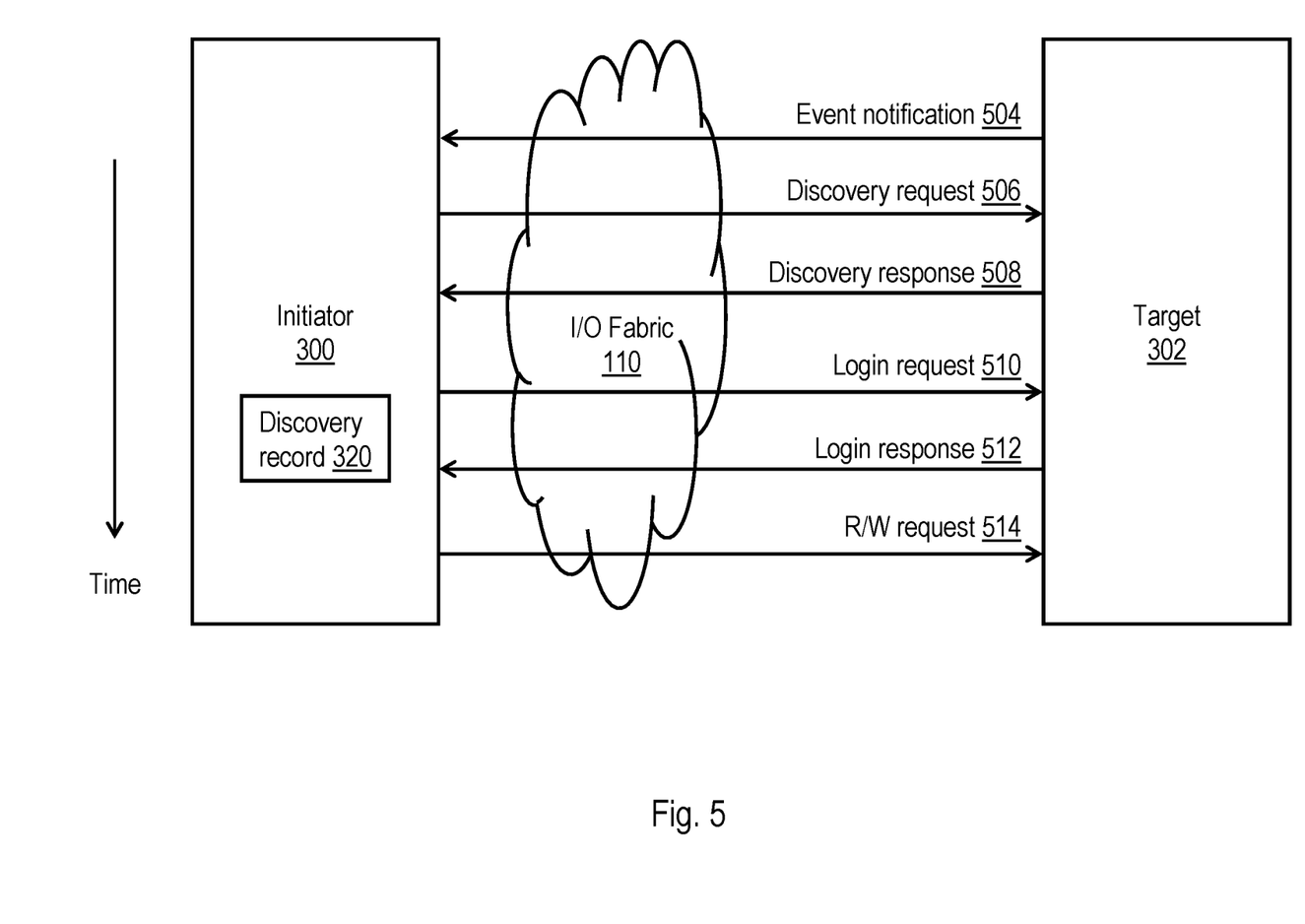
FIG. 5 is a second time-space diagram of communication between an initiator and a target in accordance with one embodiment.

Referring now to FIG. 4, there is depicted a high-level logical flowchart of an exemplary process by which a target communicates with an initiator in accordance with one embodiment. To promote greater understanding, the process of FIG. 4 will be described with additional reference to the time-space diagram given in FIG. 5. It should be appreciated that the described process assumes the reconfiguration of one target (e.g., LUN 124 or storage device 130) and that, in the event that multiple targets are reconfigured, an instance of the process can be performed for each reconfigured target.

The process of FIG. 4 begins at block 400 and then proceeds to block 402, which illustrates a controller 140 of data storage system 120 determining whether or not to reconfigure a target 302 within data storage system 120. If not, the process of FIG. 4 simply iterates at block 402. In response to determining to reconfigure a target 302 within data storage system 120, a further determination is made at block 404 whether or not the reconfiguration changes the target node name of the target 302. If not, controller 140 performs other processing (block 406), and the process of FIG. 4 ends at block 430. If, however, controller 140 determines at block 404 that the reconfiguration of the target 302 includes a change to the target node name of the target 302, the process proceeds from block 404 to block 410.

Block 410 depicts controller 140 allowing any existing sessions between initiators 300 and the target 302 to continue uninterrupted while updating the target node name of the target 302. In addition, as shown at block 412 of FIG. 4, controller 140 notifies each initiator 300 with which target 302 currently has an active session of the name change of target 302, for example, via an event notification 504 (see FIG. 5). In iSCSI, the change of the target node name of target 302 can be communicated, for example, as an asynchronous message (opcode 0x32). In NVMeF, the change of the target node name of target 302 can be communicated, for example, as an Asynchronous Event Request. The reconfiguration notification preferably includes the new target node name and the former target node name of target 302.

The process of FIG. 4 proceeds from block 412 to block 414, which illustrates controller 140 awaiting receipt on I/O fabric 110 of a discovery request 506 from a particular initiator 300 in the session establishment process described above with reference to block 224 of FIG. 2. In response to receipt of discovery request 506, controller 140 provides a discovery response 508 to initiator 300 (block 416). As noted above, a discovery response 508, typically includes discovery information including, for example, a set of target Internet Protocol (IP) addresses, a port number, and a target node name (e.g., the iSCSI Qualified Name (IQN) or NVMe Qualified Name (NQN)) of target 302. As indicated at block 418, controller 140 then awaits receipt of a login request 510 of the initiator 300, which, as described above with reference to block 210 of FIG. 2, specifies the new target node name of target 302. In response to receipt of login request 510 specifying the new target node name of target 302, controller 140 provides initiator 300 a login response 512 indicating a successful login (block 420). With the session successfully re-established between initiator 300 and target 302, controller 140 services read and/or write requests of initiator 300 (block 422 and FIG. 5, reference numeral 514). Thereafter, the process of FIG. 4 ends at block 430. As noted above, following the establishment of the new session at block 420, one or more of the existing session(s) with the initiator 302 may be terminated by initiator 302 logging out of those session(s).

As has been described, in at least one embodiment, a controller of a data storage system reconfigures a target storage node within the data storage system including by assigning the target storage node a new target node name in place of a former target node name. The controller provides a reconfiguration notification, the former target node name, and the new target node name to a host platform having an ongoing first communication session with the target storage node. Following the reconfiguration notification, the controller responds to a login request of the host platform and establishes a new second communication session between the host platform and the target storage node.

In at least one embodiment, a processor of a host platform receives from a data storage system a reconfiguration notification specifying a new target node name assigned to a target storage node within the data storage system with which the host platform has an ongoing first communication session via an input/output (I/O) fabric. In response to receiving the reconfiguration notification, the processor automatically transmits to the data storage system via the I/O fabric a discovery request specifying address information for the data storage system. Thereafter, the processor logs into the target storage node and establishes a new second communication session between the host platform and the target storage node. The host platform can then logout of the now-stale first communication session.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown and described with reference to one or more preferred embodiments, it will be understood by those skilled in the art that various changes in form and detail may be made therein without departing from the spirit and scope of the invention.

For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage environment, the method comprising:
    a controller of a data storage system reconfiguring a target storage node within the data storage system, wherein the reconfiguring includes assigning the target storage node a new target node name in place of a former target node name;
    the controller providing a reconfiguration notification, the former target node name, and the new target node name to a host platform having an ongoing first communication session with the target storage node; and
    following the reconfiguration notification, the controller responding to a login request of the host platform and establishing a new second communication session between the host platform and the target storage node.

2. The method of claim 1, wherein the new target node name is one of set including an as Internet Small Computer System Interface (iSCSI) Qualified Name and a Non-Volatile Memory Express Qualified Name.

3. The method of claim 1, wherein providing the reconfiguration notification includes the controller transmitting, via an input/output fabric communicatively coupling the controller and host platform, a notification including the new target node name and the former target node name.

4. The method of claim 1, wherein assigning the target storage node a new target node name includes assigning a logical unit (LUN) the new target node name.

5. A method in a data storage environment, the method comprising:
  a processor of a host platform receiving from a data storage system a reconfiguration notification specifying a new target node name assigned to a target storage node within the data storage system with which the host platform has an ongoing first communication session via an input/output (I/O) fabric;
  in response to receiving the reconfiguration notification, the processor automatically transmitting to data storage system via the I/O fabric a discovery request for the target storage node; and
  thereafter, the processor logging into the target storage node and establishing a new second communication session between the host platform and the target storage node.

6. The method of claim 5, and further comprising the processor persistently storing the new target node name within a discovery record at the host platform.

7. The method of claim 5, wherein the new target node name is one of set including an as Internet Small Computer System Interface (iSCSI) Qualified Name and a Non-Volatile Memory Express Qualified Name.

8. The method of claim 5, and further comprising the processor, after establishing the second communication session, logging out of the first communication session.

9. A program product, comprising:
  a data storage device; and
  program code stored within the data storage device that, when executed, causes a controller of a data storage system to perform:
    reconfiguring a target storage node within the data storage system, wherein the reconfiguring includes assigning the target storage node a new target node name in place of a former target node name;
    providing a reconfiguration notification, the former target node name, and the new target node name to a host platform having an ongoing first communication session with the target storage node; and
    following the reconfiguration notification, responding to a login request of the host platform and establishing a new second communication session between the host platform and the target storage node.

10. The program product of claim 9, wherein the new target node name is one of set including an as Internet Small Computer System Interface (iSCSI) Qualified Name and a Non-Volatile Memory Express Qualified Name.

11. The program product of claim 9, wherein providing the reconfiguration notification includes transmitting, via an input/output fabric communicatively coupling the controller and host platform, a notification including the new target node name and the former target node name.

12. The program product of claim 9, wherein assigning the target storage node a new target node name includes assigning a logical unit (LUN) the new target node name.

13. A program product, comprising:
  a data storage device; and
  program code stored within the data storage device that, when executed, causes a processor of a host platform to perform:
    receiving from a data storage system a reconfiguration notification specifying a new target node name assigned to a target storage node within the data storage system with which the host platform has an ongoing first communication session via an input/output (I/O) fabric;
    in response to receiving the reconfiguration notification, automatically transmitting to data storage system via the I/O fabric a discovery request for the target storage node; and
    thereafter, logging into the target storage node and establishing a new second communication session between the host platform and the target storage node.

14. The program product of claim 13, wherein the program code further causes the processor to perform persistently storing the new target node name within a discovery record at the host platform.

15. The program product of claim 13, wherein the new target node name is one of set including an as Internet Small Computer System Interface (iSCSI) Qualified Name and a Non-Volatile Memory Express Qualified Name.

16. The program product of claim 13, wherein the program code further causes the processor to perform logging out of the first communication session after establishing the second communication session.

17. A data storage system, comprising:
  a plurality of data storage devices;
  a controller configured to perform:
    reconfiguring a target storage node associated at least one of the plurality of data storage devices within the data storage system, wherein the reconfiguring includes assigning the target storage node a new target node name in place of a former node name;
    providing a reconfiguration notification, the former node name, and the new target node name to a host platform having an ongoing first communication session with the target storage node; and
    following the reconfiguration notification, responding to a login request of the host platform and re-establishing a new second communication session between the host platform and the target storage node.

18. The data storage system of claim 17, wherein the new target node name is one of set including an as Internet Small Computer System Interface (iSCSI) Qualified Name and a Non-Volatile Memory Express Qualified Name.

19. The data storage system of claim 17, wherein providing the reconfiguration notification includes transmitting, via an input/output fabric communicatively coupling the controller and host platform, a notification including the new target node name and the former target node name of the target storage node.

20. The data storage system of claim 17, wherein assigning the target storage node a new target node name includes assigning a logical unit (LUN) the new target node name.

21. The method of claim 1, wherein the reconfiguring includes reconfiguring the target storage node while the host platform has the ongoing first communication session with the target storage node.

* * * * *